United States Patent
Dunne

(10) Patent No.: US 7,239,699 B2
(45) Date of Patent: Jul. 3, 2007

(54) MONITOR NETWORK FOR A DIGITAL SWITCHING CROSS-CONNECT MODULE

(75) Inventor: Denise E. Dunne, Chanhassen, MN (US)

(73) Assignee: ADC Telecommunications, Inc., Eden Prairie, MN (US)

(*) Notice: Subject to any disclaimer, the term of this patent is extended or adjusted under 35 U.S.C. 154(b) by 764 days.

(21) Appl. No.: 10/199,980

(22) Filed: Jul. 19, 2002

(65) Prior Publication Data

US 2004/0013264 A1    Jan. 22, 2004

(51) Int. Cl.
*H04M 1/00* (2006.01)
*H04M 9/00* (2006.01)

(52) U.S. Cl. .................................. 379/413.04

(58) Field of Classification Search ................ 379/333, 379/335, 413.04
See application file for complete search history.

(56) References Cited

U.S. PATENT DOCUMENTS

| | | | |
|---|---|---|---|
| 3,912,849 A * | 10/1975 | Thomas | ...................... 174/16.1 |
| 4,749,968 A | 6/1988 | Burroughs | |
| 4,768,961 A | 9/1988 | Lau | |
| 4,815,104 A | 3/1989 | Williams et al. | |
| 5,147,992 A | 9/1992 | Eriksen et al. | |
| 5,214,673 A | 5/1993 | Morgenstern et al. | |
| 5,233,501 A | 8/1993 | Allen et al. | |
| 5,246,378 A | 9/1993 | Seiceanu | |
| 5,348,491 A | 9/1994 | Louwagie et al. | |
| 5,413,494 A | 5/1995 | Dewey et al. | |
| 5,467,062 A | 11/1995 | Burroughs | |
| 5,546,282 A | 8/1996 | Hill et al. | |
| 5,913,701 A * | 6/1999 | Olson et al. | ................. 439/668 |

FOREIGN PATENT DOCUMENTS

| | | |
|---|---|---|
| WO | WO 93/20600 | 10/1993 |
| WO | WO 94/08429 | 4/1994 |
| WO | WO 98/38703 | 9/1998 |
| WO | WO 00/30219 | 5/2000 |

OTHER PUBLICATIONS

Brochure, "Video Signal Distribution Products," *ADC Telecommunications*, pp. 47 (Oct. 1996).

* cited by examiner

*Primary Examiner*—Curtis Kuntz
*Assistant Examiner*—Alexander Jamal
(74) *Attorney, Agent, or Firm*—Merchant & Gould P.C.

(57) ABSTRACT

The present disclosure relates to a DSX device including a jack body with three ports including a monitor port, a switching mechanism within the jack body for making and breaking an electrical connection between the other two ports when a plug is withdrawn or inserted and a monitor network including a dielectric substrate electrically connecting the monitor port and one of the other ports. The present disclosure also relates to DSX modules incorporating DSX devices.

26 Claims, 12 Drawing Sheets

MONITOR NETWORK FOR A DIGITAL SWITCHING CROSS-CONNECT MODULE

FIELD OF THE INVENTION

The present invention relates generally to digital cross-connect equipment. More particularly, the present invention relates to monitor arrangements for cross-connect switching modules.

BACKGROUND OF THE INVENTION

In the telecommunications industry, the use of switching jacks to perform cross-connect and monitoring functions is well known. The jacks may be mounted to replaceable cards or modules which in turn may be mounted in a chassis, and multiple chassis may be mounted together in an equipment rack. Modules for use in co-axial environments are described in U.S. Pat. No. 5,913,701, which is incorporated herein by reference. Modules for use in twisted pair applications are described in U.S. Pat. No. 6,116,961. Cross-connect modules are also used with fiber optic communications systems.

FIG. 1 shows a prior art cross-connect arrangement of the type used for co-axial applications. The depicted arrangement includes two jack modules 20, 22. The jack modules 20, 22 may be mounted in separate chassis that are in turn mounted on separate racks. Each jack module 20, 22 is cabled to a separate network element (i.e., piece of telecommunications equipment). For example, jack module 20 is connected to equipment 24 by cables 26, and jack module 22 is connected to equipment 28 by cables 30. The pieces of equipment 24 and 28 are interconnected by cross-connect jumpers 32 placed between the two jack modules 20 and 22. Each jack module 20, 22 includes IN and OUT ports 34 and 36 for direct access to the equipment's input and output signals. Each module 20, 22 also includes X-IN and X-OUT ports 35, 37 for providing direct access to the cross-connect input and cross-connect output signals. Ports 34–37 provide a means to temporarily break the connection between the pieces of equipment 24 and 28 that are cross-connected together, and to allow access to the signals for test and patching operations. The jack modules 20, 22 also include monitor ports 38 for non-intrusive access to the input and output signals of each piece of telecommunications equipment 24, 28.

A typical telecommunications central office includes many jack modules and a large number of bundled cables interconnecting the modules. Consequently, absent indicators, it is difficult to quickly determine which two jack modules are cross-connected together. To assist in this function, the jack modules 20, 22 include indicator lights 40 wired to power 42 and ground 44. Switches 46 are positioned between the indicator lights 40 and ground 44. The indicator lights 40 are also electrically connected to pin jacks 48 located at the rear of the jack modules 20, 22. The pin jacks 48 provide connection locations for allowing the tracer lamp circuits corresponding to each of the modules 20, 22 to be interconnected by a cable 50. The cable 50 is typically bundled with the cross-connect cables 32. When either switch 46 is closed, the indicator lamps 40 corresponding to both of the jack modules 20, 22 are connected to ground and thereby illuminated. Thus, by closing one of the switches 46, the two jack modules 20, 22 that are cross-connected can be easily identified by merely locating the illuminated tracer lamps.

SUMMARY

The present disclosure describes representative embodiments that include examples of how several different inventive concepts can be practiced. It will be appreciated that the inventions can be used together or separately from one another. It will further be appreciated that the examples embodying the inventive concepts are merely illustrative, and that variations can be made with respect to the depicted examples without departing from the broad scope of the inventive concepts.

An example embodiment disclosed herein relates to a jack module having a monitor network that can be efficiently manufactured with minimal labor.

BRIEF DESCRIPTION OF THE DRAWINGS

The accompanying drawings, which are incorporated in and constitute a part of the specification, illustrate various embodiments that are examples of how certain inventions can be put into practice. A brief description of the drawings is as follows.

DETAILED DESCRIPTION

Figure 1:
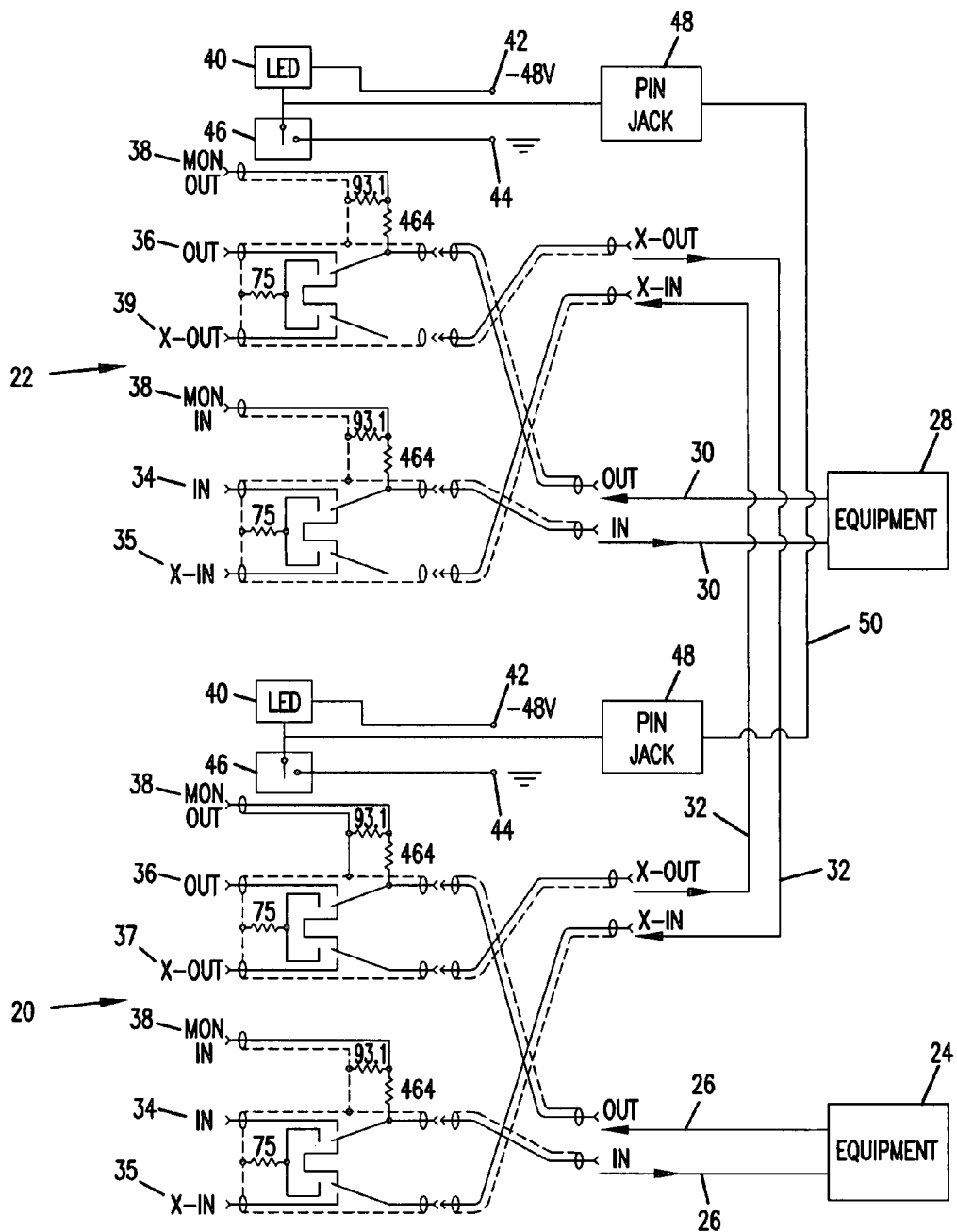
FIG. 1 shows a prior art cross-connect arrangement of the type used for co-axial applications.
Figure 2:
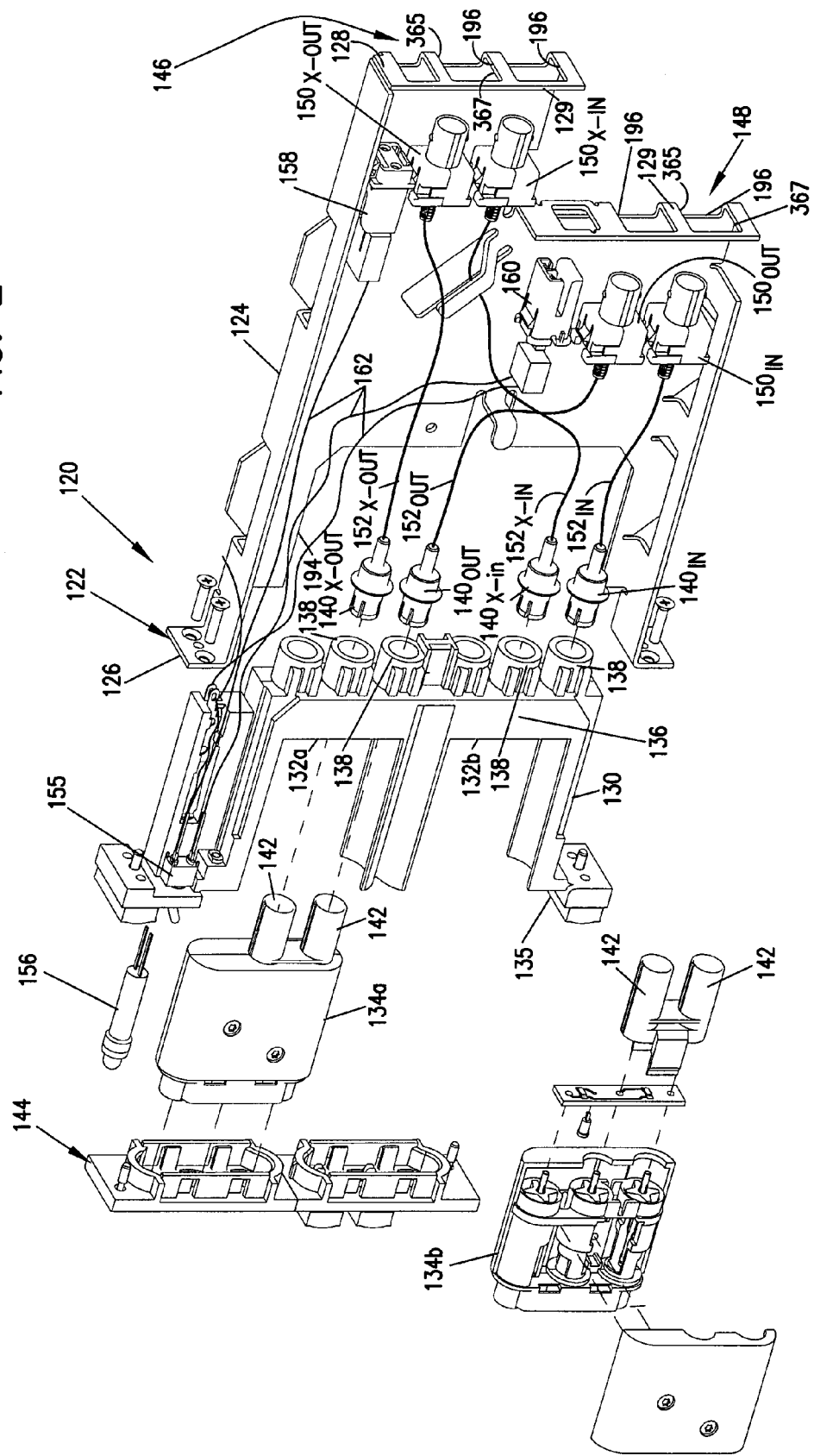
FIG. 2 illustrates a cross-connect module including examples of numerous inventive concepts can be put into practice.

FIG. 2 illustrates a jack module 120 including examples of numerous inventive concepts. The jack module 120 includes a housing 122 having a main frame 124. The main frame 124 includes a front end 126 positioned opposite from a rear end 128. A front jack mount 130 is mounted at the front end 126 of the main frame 124. The front jack mount 130 includes pockets 132a, 132b for respectively receiving jack devices 134a, 134b. Front ends of the pockets 132a, 132b are open, and back ends of the pockets 132a, 132b are closed by a rear wall 136 of the front jack mount 130. Connector mounts 138 are defined within the rear wall 136. The connector mounts 138 are adapted for receiving jack interface connectors 140IN, 140OUT, 140X-IN, 140X-OUT (collectively referred to with reference number 140). When the jack devices 134a, 134b are inserted within the pockets 132a, 132b, connectors 142 corresponding to the jack devices 134a, 134b interconnect with the jack interface connectors 140. The front side of the front jack mount 130 is enclosed by a removable front cover 144.

Referring still to FIG. 2, the rear end 128 of the main frame 124 includes a rear wall 129 having upper and lower connector mounting locations 146, 148. The lower mounting location 148 is inset relative to the upper mounting location 146. Rear connectors 150X-OUT, 150X-IN, 150OUT and 150IN (collectively referred to with reference number 150) are mounted at the rear end 128. For example, connectors 150X-OUT and 150X-IN are mounted at the upper mounting location 146, and connectors 150OUT and 150IN are mounted at the lower mounting location 148. Connectors 150X-OUT and 150X-IN are adapted for providing cross-connections between modules while the connectors 150OUT and 150IN are adapted for providing connections to network elements (e.g., telecommunications equipment). As shown in FIG. 2, cables 152X-OUT, 152X-IN, 152IN and 152OUT (collectively referred to with reference number 152) electrically connect the jack devices 134a, 134b to the rear connectors 150. For example, cable 152X-OUT connects connector 150X-OUT to connector 140X-OUT, cable 152X-IN connects connector 150X-IN to connector 140X-IN, cable 152OUT connects connector 150OUT to connector 140OUT, and cable 152IN connects connector 150IN to connector 140IN.

Referring still to FIG. 2, the jack module 120 is also preferably equipped with a tracer lamp circuit. The tracer lamp circuit includes a tracer lamp such as a light emitting diode (LED) 156 mounted at the front of the module 120. A tracer lamp switch 155 is positioned adjacent the LED 156. The tracer lamp circuit also includes a pin jack housing 158 mounted at the upper mounting location 146 and a card edge connector 160 mounted at the lower mounting location 148. A harness 162 electrically connects the card edge connector 160, the pin jack housing 158, and the switch 155 to the LED 156. It will be appreciated that the pin jack housing 158 is adapted for connecting the tracer lamp circuit 154 to the tracer lamp circuit of a cross-connected jack module, and the card edge connector 160 is adapted for connecting the tracer lamp circuit 154 to power and ground.

The jack module 120 is also described in U.S. application Ser. No. 10/199,981 entitled Digital Switching Cross-Connect Module, which was filed on a date concurrent herewith, and which is hereby incorporated by reference in its entirety.

I. Switching Assemblies

Figure 3:
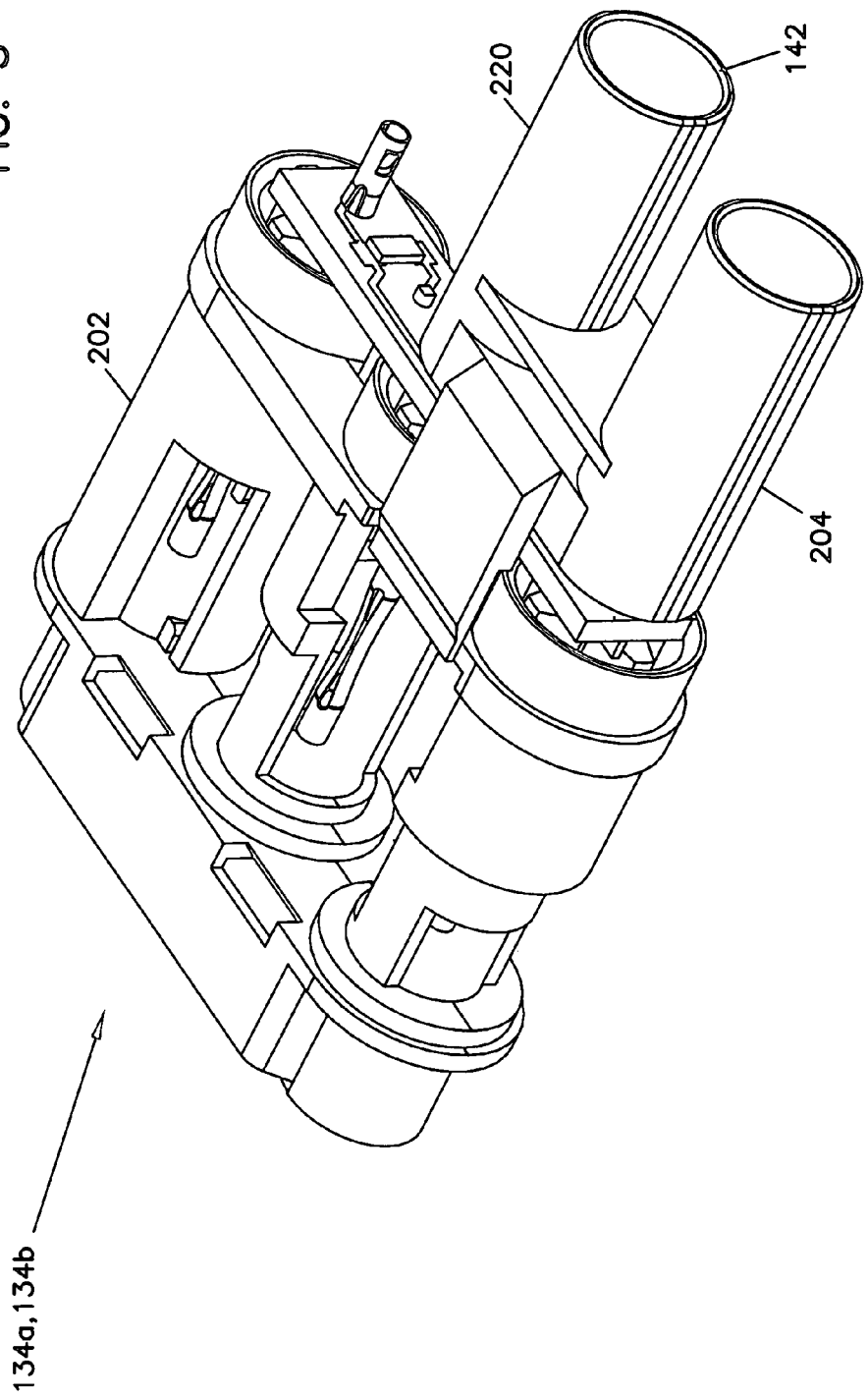
FIG. 3 is a rear perspective view of a switching jack of the module of FIG. 2.
Figure 4:
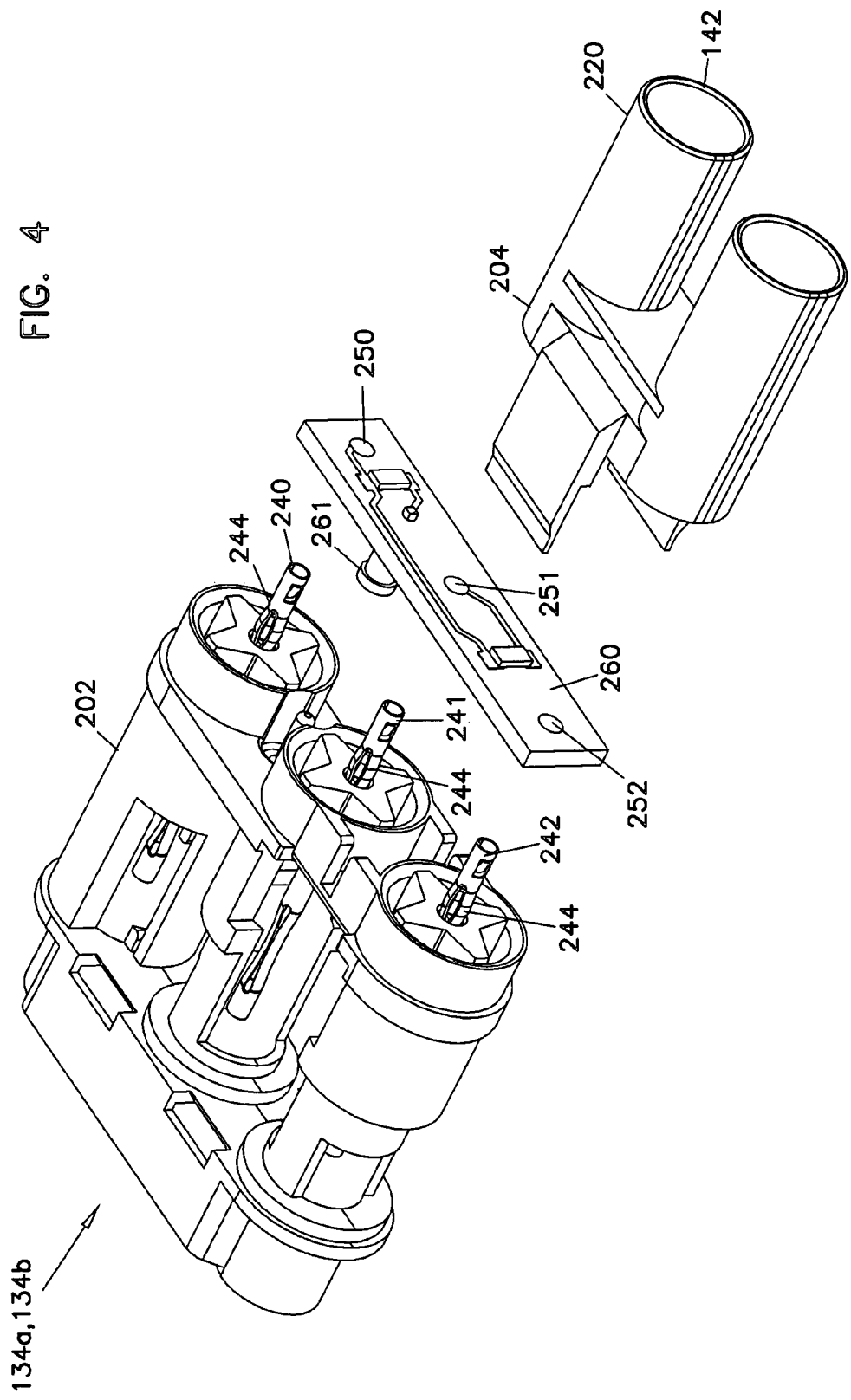
FIG. 4 is a rear, exploded view of the switching jack of FIG. 3.
Figure 5:
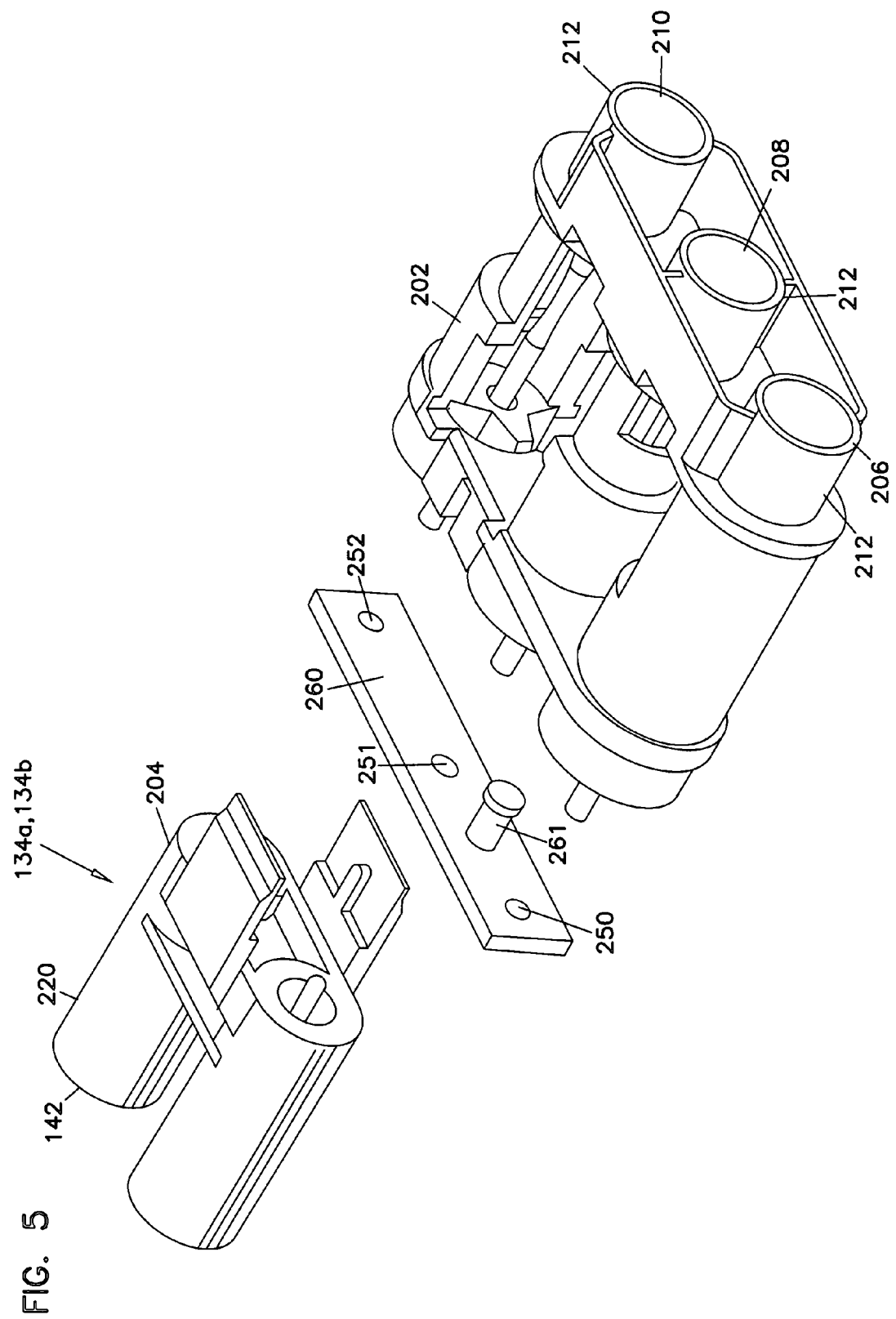
FIG. 5 is a front, exploded view of the switching jack of FIG. 3.

FIGS. 3–5 show one of the jack devices 134a, 134b in isolation from the jack module 120. Preferably, the two jack devices 134a, 134b have identical configurations to promote manufacturing efficiency. However, jacks of different configurations could also be used.

Referring to FIGS. 3–5, the depicted jack device 134a, 134b includes a front body 202 interconnected with a rear body 204. In a non-limiting embodiment, the front and rear bodies 202, 204 can be made of separate die cast metal pieces. The front body 202 includes front sleeves 212 that define a monitor port 206, a cross-connect access port 208 and an equipment access port 210. The front body 202 also includes a circuitry housing positioned between the sleeves 212 and the rear body 204 for housing switches and other circuit components. The rear body 204 includes sleeves 220 that define the connectors 142. The jack devices 134a, 134b also include center conductors 240, 241 and 242 that respectively correspond to the monitor port 206, the cross-connect access port 208 and the equipment access port 210. The conductors 240–242 include compliant spring portions 244 (see FIG. 4) positioned adjacent the rear end of the front body 202. The jack devices 134a, 134b also include monitor networks for providing electrical connections between the conductors 240 of the monitor ports 206 and the conductors 241 of the cross-connect access ports 208. As shown in FIG. 4, the monitor network includes a printed circuit board 260 having through-holes 250–252 for respectively receiving the conductors 240–242. Also included in the monitor network is a grounding contact 261. At least the through-holes 250 and 251 are plated with an electrically conductive material such that the spring portions 244 of the corresponding center conductors 240 and 241 make electrical contact with tracings on the circuit board 260. As will be described in greater detail below, the tracings provide an electrical connection between the center conductors 240 and 241.

Figure 6:
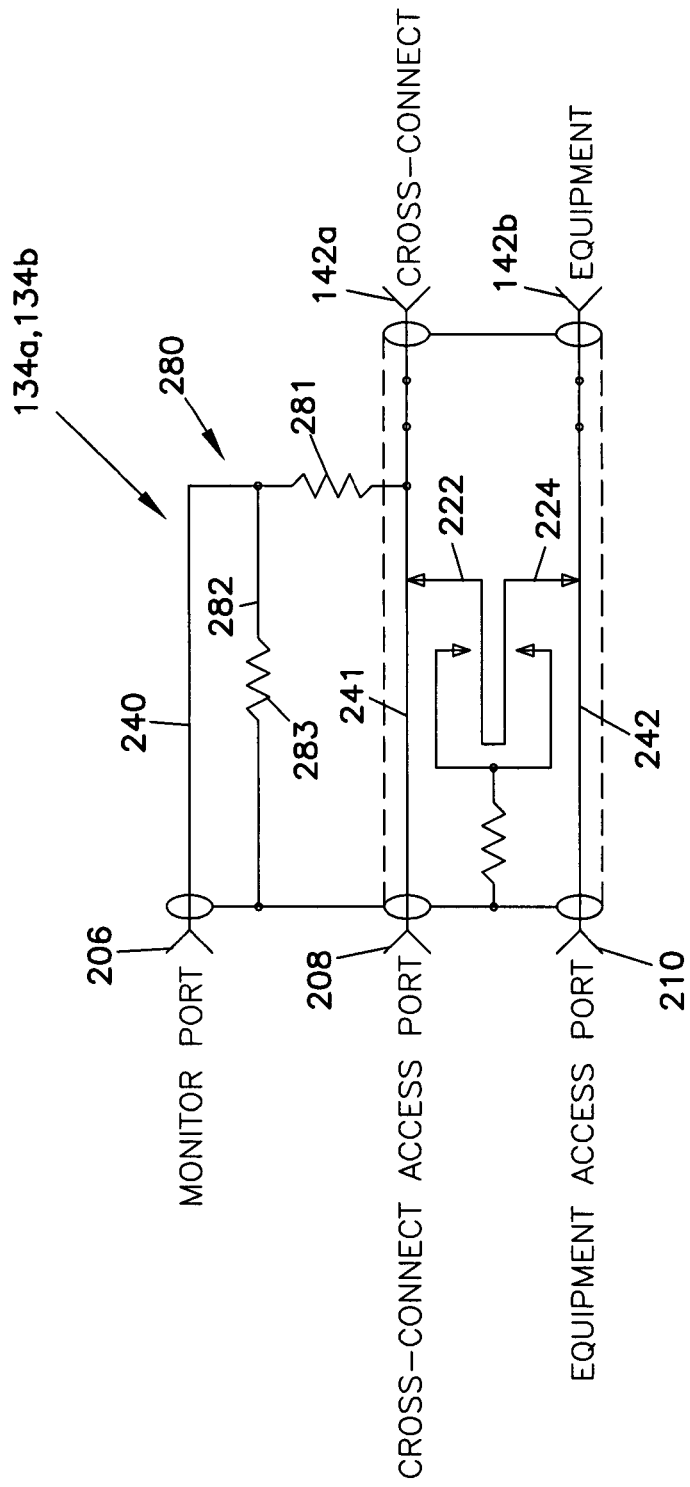
FIG. 6 is a schematic circuit diagram of the switching jack of FIG. 3.
Figure 7:
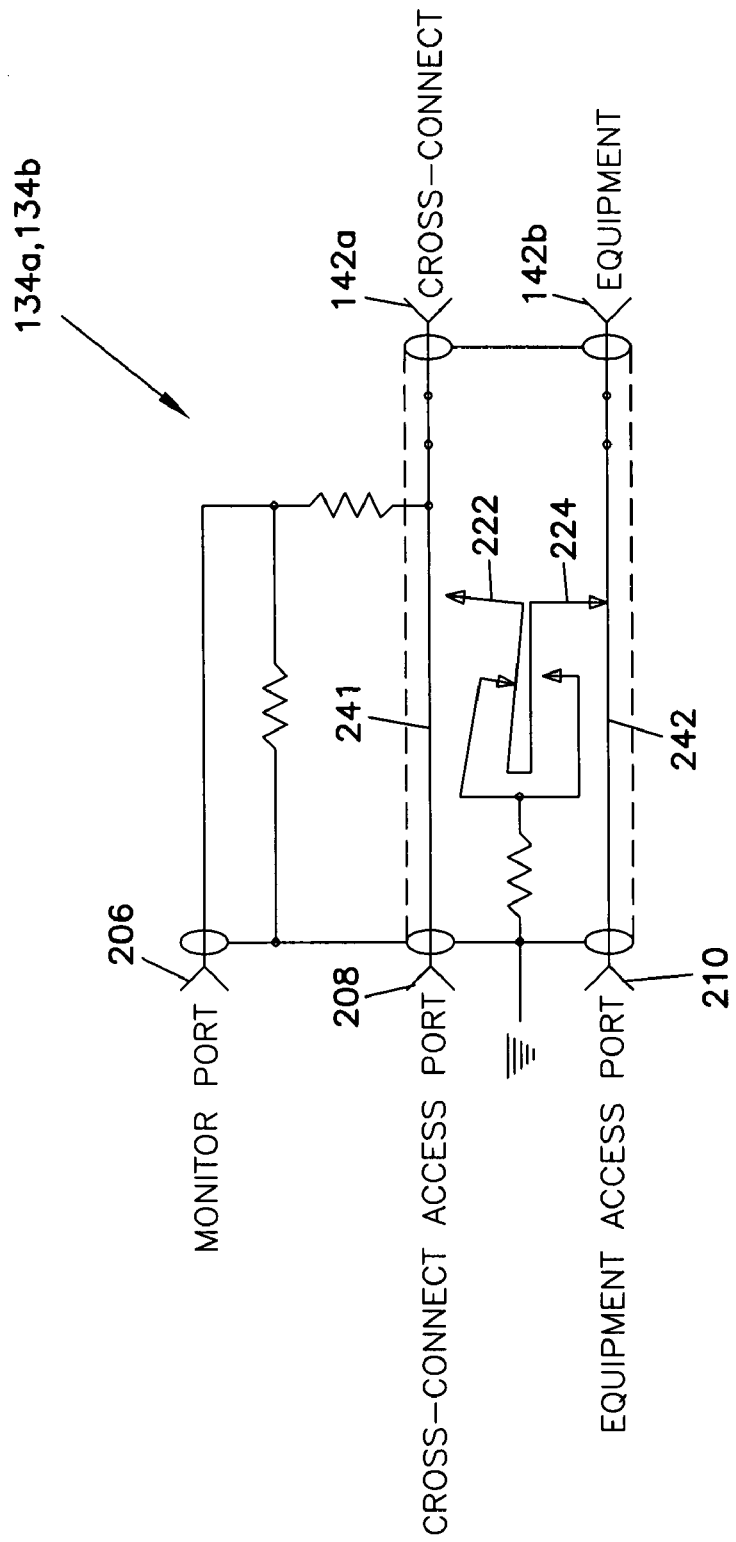
FIG. 7 illustrates the circuit diagram of FIG. 6 with a plug inserted within the cross-connect axis port.
Figure 8:
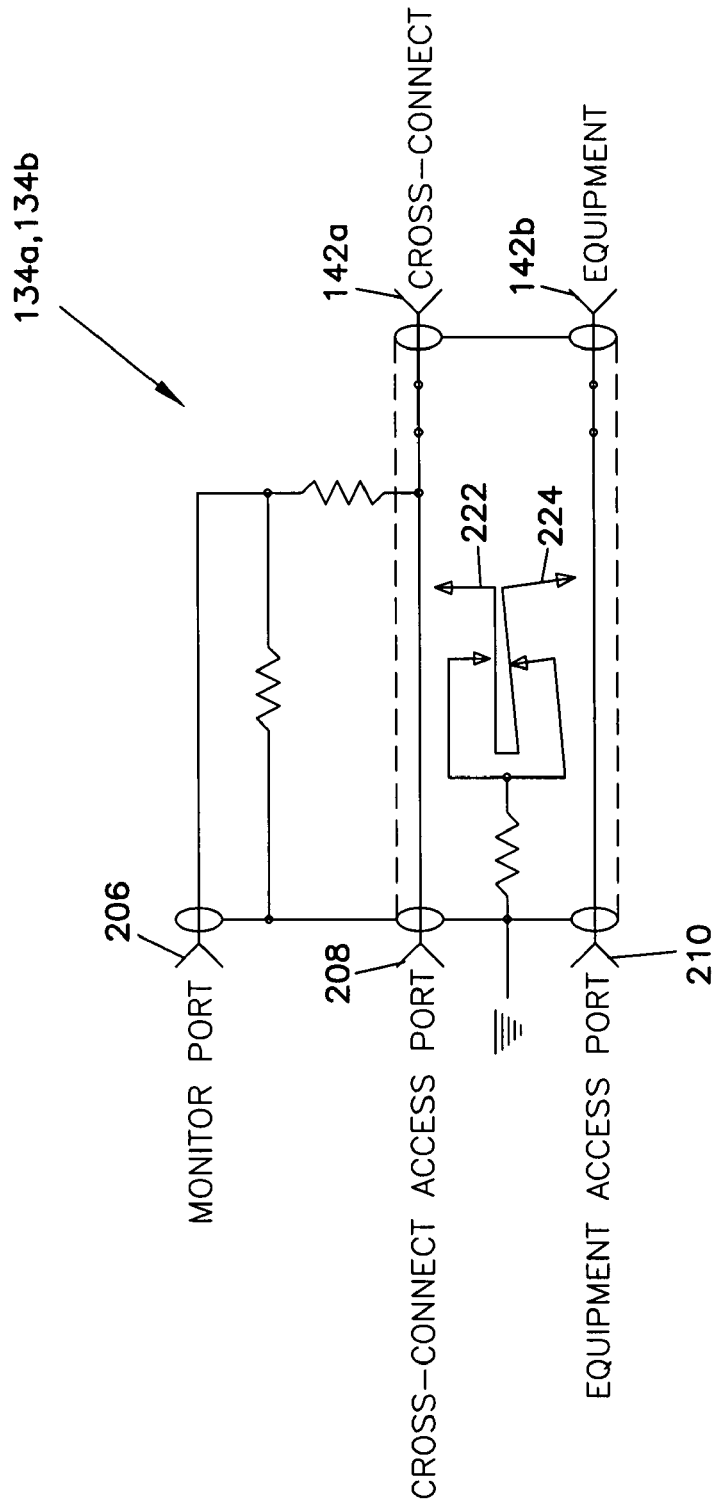
FIG. 8 illustrates the circuit diagram of FIG. 6 with a plug inserted within the equipment access port.

FIGS. 6–8 schematically show an exemplary switching circuit configuration for the jack devices 134a, 134b. When no plug is inserted within either of the ports 208, 210, connectors 142a and 142b are electrically connected by springs 222 and 224 which engage the center conductors 241 and 242. When a plug is inserted into port 208 as shown in FIG. 7, the electrical connection between the connectors 142a and 142b is broken (i.e., the spring 222 disengages the center conductor 241) and a direct electrical connection is provided between port 208 and the connector 142a. Concurrently, the center conductor 242 is grounded. When a plug inserted within port 210 as shown in FIG. 8, the electrical connection between connectors 142a and 142b is broken (i.e., the spring 224 disengages from the center conductor 242) and a direct electrical connection is provided between port 210 and connector 142b. Concurrently, the center conductor 242 is electrically connected to ground.

The port 206 allows signals being transferred through the jack device to be non-intrusively monitored. To provide access to signals passing through the center conductor 241 of the port 208, the monitor network includes a first electrical pathway 280 between the center conductor 241 and the center conductor 240. The first electrical pathway 280 includes a resister 281 adapted for providing a monitor level signal at the monitor port 206 (e.g., a 464 ohm resistor). The monitor network also includes a second electrical pathway 282 between the first electrical pathway 280 and ground (e.g., the die cast body of the jack device). A resistor 283 (e.g., a 93.1 ohm resistor) is positioned along the second electrical pathway 282.

Figure 9:
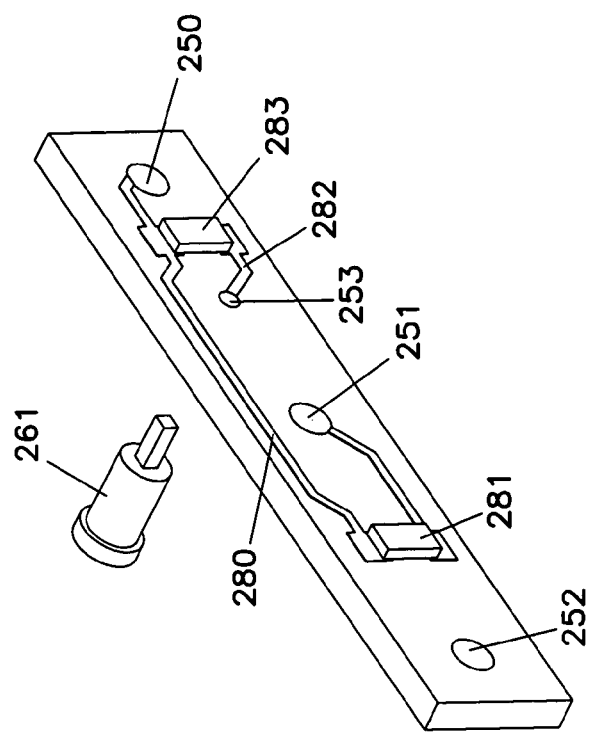
FIG. 9 is a rear perspective view of the monitor circuit of the switching jack of FIGS. 4 and 5.
Figure 10:
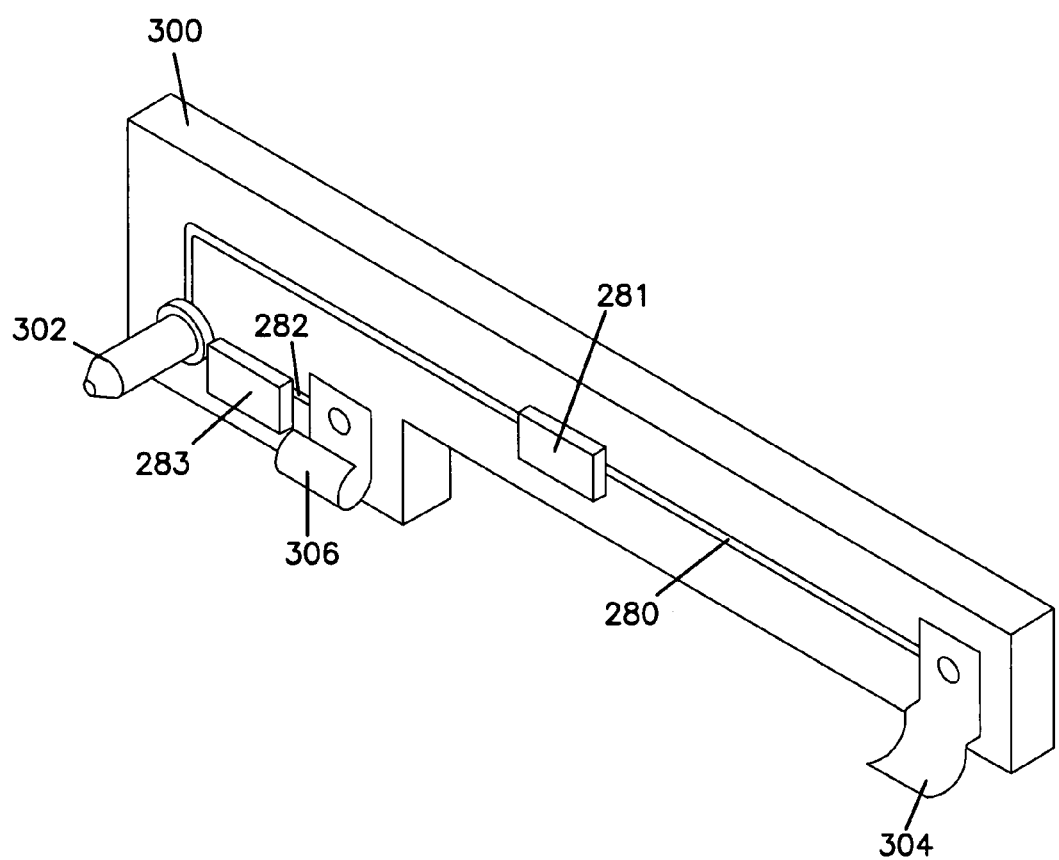
FIG. 10 is a front perspective view of a first alternative embodiment of the monitor circuit of the switching jack FIGS. 4 and 5.
Figure 11:
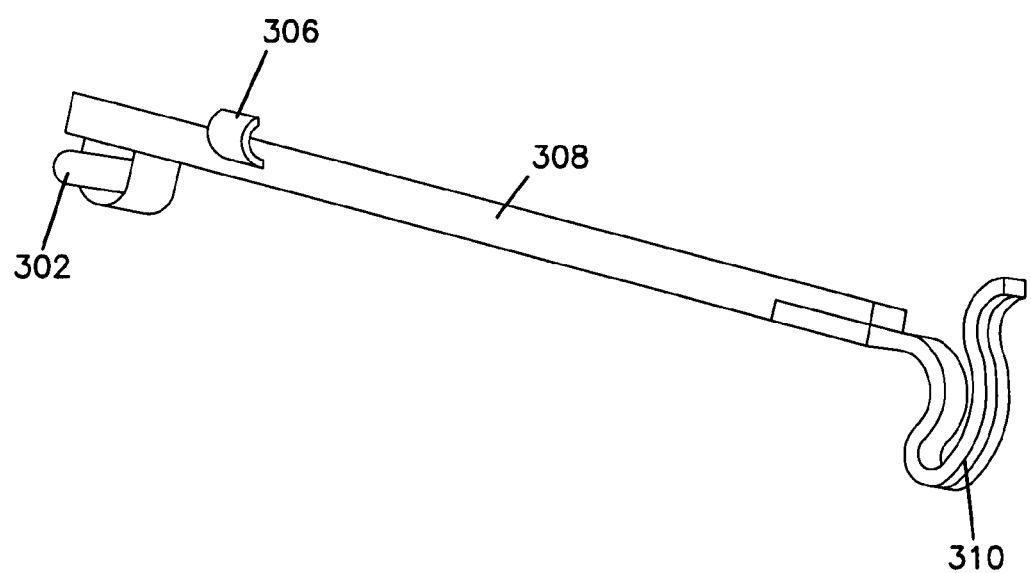
FIG. 11 is a front perspective view of a second alternative embodiment of a monitor circuit for use with the switching jack FIGS. 4 and 5.
Figure 12:
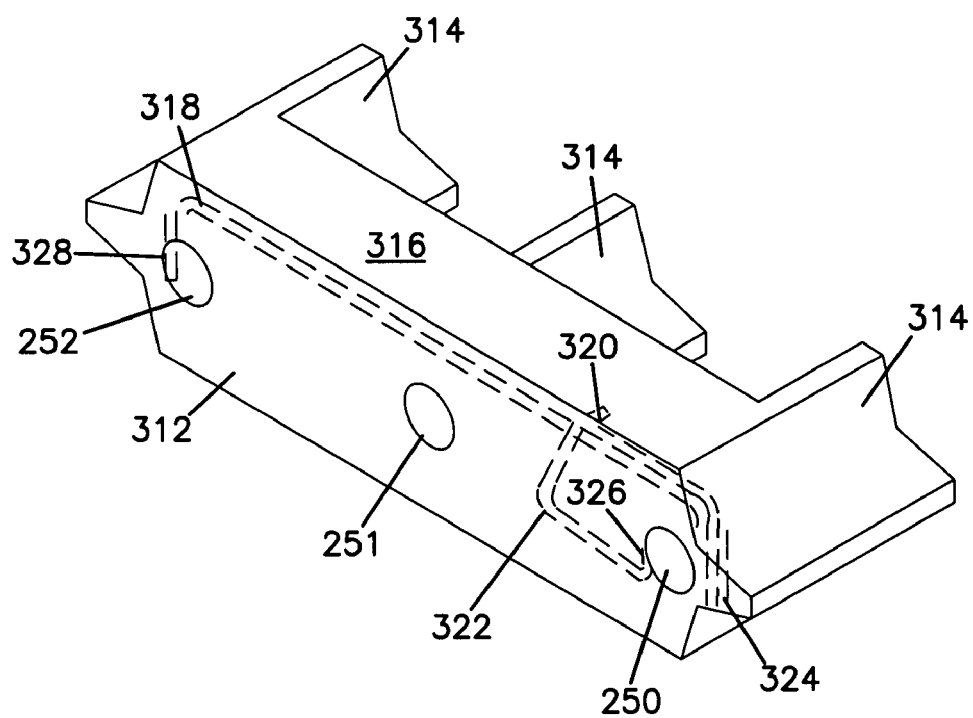
FIG. 12 is a rear perspective view of a third alternative embodiment of a monitor circuit for use with the switching jack of FIGS. 4 and 5.

Elements of the monitor network may be mounted to or supported by a variety of forms of dielectric substrates. FIGS. 9 and 10 show the dielectric substrate in the form of a circuit board to which resistors may be mounted and on which the electrical pathways may be laid. FIGS. 11 and 12 show the dielectric substrate in the form of a molded or shaped housing (e.g., a plastic housing) within which the electrical pathways are defined and the resistors are supported. The substrate also holds contacts of the electrical pathways in a fixed orientation that is closely matched to the spacing of the conductors of the jack device. In doing so, installation of the monitor circuit into the jack device is simplified. The substrate containing the monitor circuits and contacts is placed within the jack device so that the contacts engage the appropriate conductors within the jack device. No additional wiring or soldering of connectors is required. It is anticipated that other forms of dielectric substrates may be used to form monitor networks within the scope of the present invention.

FIG. 9 shows the physical layout of the electrical pathways 280 and 282 on the circuit board 260. The second electrical pathway 282 includes a through-hole 253 into which is inserted a grounding contact 261. When assembled into the switching jack 134a or 134b, the grounding contact 261 provides electrical connectivity and a ground path between the second electrical pathway and the body of the jack device. Configured as shown, the monitor circuit permits monitoring of electrical signals being transmitted through port 208. Alternatively, the first electrical path 280 could electrical connect to through-hole 252 to monitor electrical signals being transmitted through port 210.

Alternative embodiments of the monitor circuit are shown in FIGS. 10 through 12. A first alternative embodiment monitor circuit is shown in FIG. 10, including a circuit board 300 on which are the first electrical path 280 with resistor 281 and the second electrical path 282 with resistor 283. Grounding contact 306 is included in electrical path 282 and provides contact between the second electrical path 282 and a ground (e.g., the body of the jack device). The first electrical path 280 includes a pin 302 which mates with center conductor 240 and a contact 304 which makes electrical contact with center conductor 242. The circuit board 300 holds the contacts 304, 302 at a pre-defined spacing that generally equals a spacing between the conductors 240, 242. Configured as shown in FIG. 10, the monitor circuit permits monitoring of the electrical signals being transmitted through port 210. Alternatively, contact 304 could be positioned to make electrical contact with center conductor 241 and permit monitoring of the electrical signals passing through port 208.

A second alternative embodiment monitor circuit is shown in FIG. 11, including a housing 308, made of a dielectric material, within which are located the embedded electrical paths 280 and 281 with embedded resistors 281 and 283. Housing 308 extends from pin 302 to a contact 310 which makes electrical contact with center conductor 242, and includes ground contact 306, allowing monitoring of the electrical signals carried through port 210. Alternatively, housing 308 could be configured to permit contact 310 to make electrical contact with center conductor 241, allowing monitoring of the electrical signals carried through port 208.

A third alternative embodiment monitor circuit is shown in FIG. 12. This embodiment includes a housing 312 made of a dielectric material (e.g., a polymeric material such as polycarbonate or other plastic material) with a main body 316 housing electrical paths 280 and 282, and resistors 281 and 283. Housing 312 also includes integrally formed insulators 314 extending into the rear of each of the ports 206, 208 and 210. Openings 250, 251, and 252 receive center conductors 240, 241, and 242, respectively, when assembled in a switching jack 134a or 134b, and electrically isolate the center conductors from the jack body. Within opening 250, contacts 324 and 326 are located so that they will be in electrical contact with center conductor 240 when so assembled. Similarly, within opening 252 is a contact 328 which will be in electrical contact with center conductor 242 when assembled. Also extending from the front of the housing 312 is a grounding contact 320 (shown in hidden lines) which makes electrical contact with the jack body and provides a ground path for the second electrical path 282. The first electrical path 280 is carried by a first member 318 (e.g., a bare wire) embedded within main body 316, electrically connecting with center conductors 240 and 242 through contacts 324 and 328, respectively. The housing 312 is preferably sufficiently rigid to hold or retain the contacts 324, 328 at a fixed spacing that corresponds to a spacing between the conductors 240, 242. The second electrical path 282 is carried by a second member 322 (e.g., a bare wire) and electrically connects center conductor 240 (via contact 326) with grounding contact 320. This configuration allows monitoring of the signals being transmitted through port 210. Alternatively, first member 318 might electrically connect center conductors 241 and 240, permitting monitoring of the electrical signals being transmitted through port 208.

It will be appreciated that many embodiments of the inventions can be made without departing from the spirit and scope of the inventions.

I claim:

1. A cross-connect module comprising:
a housing having a front end and a rear end;
a switching device positioned adjacent the front end of the of the housing, the switching device defining a front body and a rear body, the front body including sleeves that define first and second ports, the switching device also including first and second conductors corresponding to the first and second ports, the first port comprising a monitor port, the rear body including sleeves that define first connectors;
a plurality of rear connectors mounted adjacent to the rear end of the housing;
cables positioned within the housing that electrically couple the rear connectors to the first connectors of the switching devices; and
a monitor network for providing an electrical pathway between the first and second conductors, the monitor network including a circuit board and the electrical pathway formed by circuit traces on the circuit board, the circuit traces connected to the first and second conductors, the circuit board positioned between the sleeves defined by the front body and the sleeves defined by the rear body.

2. The cross-connect module of claim 1, wherein the rear connectors include cross-connect connectors and equipment connectors.

3. The cross-connect module of claim 2, wherein the first and second conductors extend into a first through-hole and a second through-hole, respectively, in the circuit board and make electrical contact with the circuit traces within the through-holes.

4. The cross-connect module of claim 2, wherein the circuit traces include two segments, a first segment electrically connecting the first conductor to the second conductor and including a first resistor, and a second segment electrically connecting the first conductor to a ground source and including a second resistor.

5. The cross-connect module of claim 4, wherein the first resistor is a 464 ohm resistor.

6. The cross-connect module of claim 4, wherein the second resistor is a 93.1 ohm resistor.

7. The cross-connect module of claim 2, wherein the first conductor includes a hollow end, the circuit board includes a pin electrically connected to the circuit traces, the pin engaging the hollow end of the conductor and electrically connecting the first conductor to the circuit traces.

8. The cross-connect module of claim 7, wherein the circuit traces are electrically connected to the second conductor by a contact mounted to the circuit board which engages a side of the second conductor.

9. The cross-connect module of claim 8, wherein the circuit traces include two segments, a first segment electrically connecting the first conductor to the second conductor and including a first resistor, and a second segment electrically connecting the first conductor to a ground source and including a second resistor.

10. The cross-connect module of claim 9, wherein the first resistor is a 464 ohm resistor.

11. The cross-connect module of claim 9, wherein the second resistor is a 93.1 ohm resistor.

12. A cross-connect module comprising:
- a housing having a front end and a rear end;
- a switching device positioned adjacent the front end of the of the housing, the switching device defining a front body and a rear body, the front body including sleeves that define first and second ports, the switching device also including first and second conductors corresponding to the first and second ports, the first port comprising a monitor port, the rear body including sleeves that define first connectors;
- a plurality of rear connectors mounted adjacent to the rear end of the housing;
- cables positioned within the housing that electrically couple the rear connectors to the first connectors of the switching devices; and
- a monitor network including an electrical pathway, the electrical pathway including a first segment with a first resistor between the first and second conductors and a second segment with a second resistor between the first conductor and a ground source, the monitor network further including a dielectric substrate which supports the first and second segments and the first and second resistors, the dielectric substrate positioned between the sleeves defined by the front body and the sleeves defined by the rear body;
- wherein the monitor network provides a connection between the conductors and the electrical pathway.

13. The cross-connect module of claim 12, wherein the dielectric substrate is a circuit board, the first and second segments are circuit traces on the circuit board and the first and second resistors are mounted to the circuit board.

14. The cross-connect module of claim 13, wherein the circuit board includes through-holes for receiving the first and second conductors and electrically connecting the first and second conductors with the electrical pathway.

15. The cross-connect module of claim 13, wherein at least one of the conductors includes a hollow end and the circuit board includes a mating pin for engaging and electrically connecting each hollow ended conductor with the electrical pathway.

16. The cross-connect module of claim 12, wherein the dielectric substrate is a housing and the electrical pathway and the resistors are supported within the housing.

17. The cross-connect module of claim 16, wherein at least one of the first and second conductors includes a hollow end and mounted to the housing is a mating pin for engaging and electrically connecting each hollow ended conductor with the electrical pathway.

18. The cross-connect module of claim 16, wherein electrical contact between at least one of the first and second conductors is established with the electrical pathway by a contact mounted to the housing which engages the side of the conductor.

19. The cross-connect module of claim 16, wherein the first and second ports are coaxial jacks, the first conductor is a first center conductor, the second conductor is a second center conductor, the housing includes a first insulator portion isolating the first center conductor from a body of the first port and receiving the first conductor within a first opening and a second insulator portion isolating the second center conductor from a body of the second port and receiving the second conductor within a second opening, and a first contact within the first opening electrically links the first conductor to the electrical pathway and a second contact within the second opening links the second conductor to the electrical pathway.

20. The cross-connect module of claim 12, wherein through-holes are provided through the circuit board for receiving the first and second conductors and contacts are provided within the through-holes for electrically linking the electrical pathway to the conductors.

21. A DSX jack comprising:
- a jack body defining a front body and a rear body, the front body including sleeves that define first, second and third ports, the first port comprising a monitor port;
- first, second and third conductors corresponding, respectively, to the first, second and third ports, the rear body including sleeves that define first connectors;
- a switching mechanism that provides an electrical connection between the second and third conductors when no plugs are inserted within the second and third ports, and that breaks the electrical connection between the second and third conductors when a plug is inserted into either of the second and third ports;
- a monitor network including an electrical pathway, the electrical pathway including a first segment with a first resistor between the first and second conductors and a second segment with a second resistor between the first conductor and a ground source, the first electrical pathway including first and second contacts that respectively engage the first and second conductors, the monitor network further including a dielectric substrate which supports the first and second segments and the first and second resistors, the dielectric substrate being sufficiently rigid to maintain the first and second contacts at a spacing that corresponds to a spacing between first and second conductors, the dielectric substrate positioned between the sleeves defined by the front body and the sleeves defined by the rear body.

22. The DSX jack of claim 21, wherein the substrate defines openings for receiving the first and second conductors.

23. A cross-connect module comprising:
- a housing having a front end and a rear end;
- a switching device positioned adjacent the front end of the of the housing, the switching device defining first and second ports, the switching device also including first and second conductors corresponding to the first and second ports, the first port comprising a monitor port;
- a plurality of rear connectors mounted adjacent to the rear end of the housing;
- cables positioned within the housing that electrically couple the rear connectors to the switching devices; and
- a monitor network for providing an electrical pathway between the first and second conductors, the monitor network including a circuit board and the electrical pathway formed by circuit traces on the circuit board, the circuit traces connected to the first and second conductors;
- wherein the rear connectors include cross-connect connectors and equipment connectors,
- wherein the circuit traces include two segments, a first segment electrically connecting the first conductor to the second conductor and including a first resistor, and a second segment electrically connecting the first conductor to a ground source and including a second resistor, wherein the first resistor is a 464 ohm resistor.

24. A cross-connect module comprising:
- a housing having a front end and a rear end;

a switching device positioned adjacent the front end of the of the housing, the switching device defining first and second ports, the switching device also including first and second conductors corresponding to the first and second ports, the first port comprising a monitor port;
a plurality of rear connectors mounted adjacent to the rear end of the housing;
cables positioned within the housing that electrically couple the rear connectors to the switching devices; and
a monitor network for providing an electrical pathway between the first and second conductors, the monitor network including a circuit board and the electrical pathway formed by circuit traces on the circuit board, the circuit traces connected to the first and second conductors;
wherein the rear connectors include cross-connect connectors and equipment connectors,
wherein the circuit traces include two segments, a first segment electrically connecting the first conductor to the second conductor and including a first resistor, and a second segment electrically connecting the first conductor to a ground source and including a second resistor, wherein the second resistor is a 93.1 ohm resistor.

25. A cross-connect module comprising:
a housing having a front end and a rear end;
a switching device positioned adjacent the front end of the of the housing, the switching device defining first and second ports, the switching device also including first and second conductors corresponding to the first and second ports, the first port comprising a monitor port;
a plurality of rear connectors mounted adjacent to the rear end of the housing;
cables positioned within the housing that electrically couple the rear connectors to the switching devices; and
a monitor network for providing an electrical pathway between the first and second conductors, the monitor network including a circuit board and the electrical pathway formed by circuit traces on the circuit board, the circuit traces connected to the first and second conductors;
wherein the rear connectors include cross-connect connectors and equipment connectors, wherein the first conductor includes a hollow end, the circuit board includes a pin electrically connected to the circuit traces, the pin engaging the hollow end of the conductor and electrically connecting the first conductor to the circuit traces, wherein the circuit traces are electrically connected to the second conductor by a contact mounted to the circuit board which engages a side of the second conductor, wherein the circuit traces include two segments, a first segment electrically connecting the first conductor to the second conductor and including a first resistor, and a second segment electrically connecting the first conductor to a ground source and including a second resistor, and wherein the first resistor is a 464 ohm resistor.

26. A cross-connect module comprising:
a housing having a front end and a rear end;
a switching device positioned adjacent the front end of the of the housing; the switching device defining first and second ports, the switching device also including first and second conductors corresponding to the first and second ports, the first port comprising a monitor port;
a plurality of rear connectors mounted adjacent to the rear end of the housing;
cables positioned within the housing that electrically couple the rear connectors to the switching devices; and
a monitor network for providing an electrical pathway between the first and second conductors, the monitor network including a circuit board and the electrical pathway formed by circuit traces on the circuit board, the circuit traces connected to the first and second conductors;
wherein the rear connectors include cross-connect connectors and equipment connectors, wherein the first conductor includes a hollow end, the circuit board includes a pin electrically connected to the circuit traces, the pin engaging the hollow end of the conductor and electrically connecting the first conductor to the circuit traces, wherein the circuit traces are electrically connected to the second conductor by a contact mounted to the circuit board which engages a side of the second conductor, wherein the circuit traces include two segments, a first segment electrically connecting the first conductor to the second conductor and including a first resistor, and a second segment electrically connecting the first conductor to a ground source and including a second resistor, and wherein the second resistor is a 93.1 ohm resistor.

* * * * *